United States Patent Office 3,465,146
Patented Sept. 2, 1969

3,465,146
FLAW DETECTION METHOD USING A DYE
PENETRANT ADDITIVE
Orlando G. Molina, Westminster, Calif., assignor to
North American Rockwell Corporation
No Drawing. Filed May 12, 1967, Ser. No. 637,926
Int. Cl. H01j 1/62
U.S. Cl. 250—71                               8 Claims

ABSTRACT OF THE DISCLOSURE

An agent is disclosed for thickening liquid dye penetrants without change in viscosity thereof, so that the thickened mixture can be applied to vertical and overhead surfaces without dripping or runoff. The preferred agent is silicon dioxide in powdered form to act as a multitude of minute sponges.

Background of invention

This invention relates to dye penetrants as used for non-destructively testing workpiece surfaces to locate and identify voids or defects therein. In the prior art, dye penetrants are typically applied in liquid form to specimen surfaces over the entire area thereof. Thereafter, excess penetrant is cleaned from the surface, leaving minute entrapments of residual dye in microscopic cracks or discontinuities in the surface.

The viscosity of the liquid vehicle used for conveying dye into microscopic defects of a surface is often a limiting factor in the sensitivity of the penetrant, since high viscosity penetrants are usually incapable of entry within extremely narrow cracks, hence leave insufficient residual dye to make a visible dye trace as required to reveal the presence of such cracks. However, where low viscosity fluids are used as the vehicle in a dye penetrant, the problems of dripping, runoff, puddling and otherwise uncontrollable random dye distribution patterns become acute, notably in the case of vertical, slanted and overhead surfaces on large workpieces such as aerial and space vehicles or missiles.

Accordingly, it is a principal object of the present invention to provide an improved penetrant composition including an additive for increasing the ability of the penetrant to adhere to vertical and overhead surfaces without excessive spreading thereover.

Moreover, it is an object in this case to provide a dye penetrant additive capable of thickening a penetrant without increasing the viscosity thereof and not affecting the sensitivity of the penetrant by addition of such additive.

It is a further object in this case to provide an additive according to the above objects adapted for use with substantially all liquid dye penetrants known to the prior art.

Other objects and advantages of the present invention will become apparent to those skilled in the art from the following detailed description.

Summary of invention

According to the present invention, the dye penetrant broadly comprises a dye constituent, a relatively slow drying liquid solvent vehicle for the dye, and a powdered or filamentary particulate adapted to function as a sponge but not chemically combining with the vehicle or the dye. The particulate should be chemically inert, whereby it does not alter the chemical composition of the dye or vehicle, and is added to the liquid dye penetrant combination in a sufficient amount to change the liquid to a grease-like or gelatin-like consistency which may be applied to vertical and overhead surfaces without flowing excessively or falling therefrom due to gravity. Illustratively, a suitable mixture of materials in the thickened dye penetrant may comprise from one to four parts by volume of silicon dioxide to one part of liquid penetrant, the preferred ratio being three parts of thickener to one of penetrant, although the proportion can be modified over a wide range depending upn the precise consistency desired for the resulting grease-like mixture. Silicon dioxide is commercially sold under the trade name Cab-O-Sil M–5. The product thus resulting does not inhibit the penetrability or sensitivity of the thickened penetrant, but only limits its flowing ability over the surface to which it is applied. The silicon dioxide-treated solution merely entraps the penetrant in a multitude of sponges formed by minute filaments, but the penetrant itself remains liquid and quickly spreads into any surface defect with which the grease-like compound comes in contact, in the same general manner that a sponge filled with water wets a surface. The dye may be any one or more of those known to the prior art, either of the daylight visible or fluorescing type. Similarly, the vehicle may be of any suitable type or composition in which the dye is soluble. The selection of any particular dye or vehicle is not critical in the instant case, since novelty resides in use of the additive, which has been found to produce the desired change of consistency without loss of sensitivity in many different commercially available and well-known dye penetrants, dyes and vehicles.

Description of preferred embodiment

Although the additive disclosed herein is usable with a wide combination of different vehicles and dyes, a particular need for this invention exists in the case of very slow drying solvent vehicles used for liquid dye penetrant inspection of vertical and overhead surfaces, wherein gravity effects on the dye penetrant tend to cause the liquid to puddle, drip or escape from the surface voids in which residual dye is initially entrapped. The additive is chemically stable and completely inert with respect to both the dye and the vehicle or other solvents used in the penetrant. The liquid vehicle of the penetrant remains in liquid form and its penetrability and sensitivity are not affected by addition of the additive disclosed herein. As noted above, the consistency of the penetrant is changed from a highly mobile liquid to a grease-like physical appearance wherein the sponge-like filaments of the additive merely hold the liquid penetrant in the location where it is applied and prevents substantially all of the normal tendency of the liquid to drip or flow over a vertical or slanted surface. However, the penetrant itself remains liquid and spreads quickly into any surface defect with which the grease-like compound comes in contact. The sensitivity of the dye penetrant test results is precisely the same for the liquid dye penetrant both before and after the addition of silicon dioxide.

The inventive concept in this case has been successfully practiced with many of the various dyes and vehicles used for commercially available liquid dye penetrants in widespread industrial use. Thus, penetrants comprising water, gasoline or kerosene, acetone, trichlorothane base and many other different vehicles and solvents have been tested in thickened form and compared with test results obtained from the same penetrant in the as-purchased liquid state. Among such penetrants successfully tested are those disclosed in the following U.S. Patents: 2,478,951; 2,839,918; 3,114,039; 3,117,227; and 3,300,642. The foregoing penetrants included both post-emulsified penetrants and water washable penetrants, fluoroescent dyes and daylight visible dyes, glycol base and oil base penetrants as well as liquid oxygen safe penetrants. Also, penetrants using lactam vehicles have been successfully tested using the concept disclosed herein. All of the testing generally conformed with the procedure broadly described in the following illustrative examples:

Example I

A penetrant comprising two parts of n-methyl-2-pyrrolidone and one part dye was initially prepared. The dye was a mixture of one-half Fluorol 7 GA fluorescent dye and one-half Calcofluor White RW, a fluorochrome agent for the dye known to the prior art and taught in U.S. Patent 2,920,203. The stated dye penetrant was then combined with Cab-O-Sil M-5 agent in a preparation of three parts thickening agent to one part liquid dye penetrant. The resulting material had a grease-like appearance and consistency. Thereafter, a comparison test of penetrant effectiveness was performed using an aluminum block which had been heated to an elevated temperature and plunged into water to produce a multitude of minute quenching cracks on the surface thereof, some of which were as small as $19/_{1,000,000}$ of an inch width or less. Liquid dye penetrant in unthickened form consisting of the stated n-methyl-2-pyrrolidone and Fluorol 7 GA dye combination was applied to one-half of the surface area, and the mentioned penetrant in thickened form was applied to the remaining half of the same test block. Both surface areas were thereafter cleaned using a suitable emulsifier, and both areas were then spray coated with a developer comprising about 19% vinyl chloride vinyl acetate copolymer resin, about 1% white mineral oil, about 61% toluene, about 14% methyl ethyl ketone, about 6% diisooctyl phthalate, and a thinner to reduce the developer to spraying consistency. When viewed under ultraviolet light using a microscope, the clarity, intensity, definition and penetrability of both penetrant compositions exhibited by the resulting dye traces was identical for both surface areas.

Example II

In another test, a penetrant comprising four parts of butyrolactone and one part of dye was prepared. The dye was a mixture of one-half Fluorol 7 GA fluorescent dye and one-half Calcofluor White RW which functioned as a brightening agent for the dye as taught in U.S. Patent 2,920,203. A portion of the foregoing dye penetrant in liquid form was thickened by addition of Cab-O-Sil M-5 in a proportion of three parts per volume of the thickening agent to one part of penetrant. The test procedure generally coincided with that discussed above, as a result of which the same defect disclosing pattern achieved by the penetrant in liquid form was produced by the penetrant in thickened form.

The thickening agent discussed above and used in both Examples I and II comprises 99% pure silicon dioxide having a specific gravity from about 2.1 to about 2.2 and a particle size range between about .015 to .020 micron. The stated material which is sold commercially as Cab-O-Sil M-5 is generally identified as an airbourne silica, uncompressed grade made by the Cabot Corporation, 125 High St., Boston 10, Mass. This additive is the preferred one for use with the concept disclosed herein, and renders any liquid dye penetrant to which it is added sufficiently adhesive to prevent runoff of the liquid when added in a suitable amount such as three parts additive to one part of dye-vehicle combination. The concept is particularly advantageous when used with a vehicle of n-methyl-2-pyrrolidone due to the extremely high dissolving power of this vehicle for dyes including Fluorol 7–GA dye, whereby great sensitivity of the thickened dye penetrant results.

In addition to the thickening agent used in Examples I and II and discussed above, other thickeners or so-called filler materials were tested generally in accordance with the procedure used in both stated examples. The other materials tested included hydroxy ethyl cellulose, ethyl cellulose, and zinc stearate. The mentioned fillers were tested with the same penetrant composition used in Example I set forth above, and also with several oily dye penetrants such as those employing a vehicle of kerosene or the like. Hydroxy ethyl cellulose was added to the penetrant of Example I in a one to one ratio by volume and produced a paste-like material which was quite effective in disclosing microscopic cracks but was noticeably less sensitive than the same penetrant without being thickened by the filler. Ethyl cellulose was found to give poor results as a dye penetrant thickener, not only with the dye penetrant mentioned in Example I but also when attempted for use with several water base and oil base liquid dye penetrants such as disclosed in the patents mentioned above. Zinc stearate was found to be usable in thickening oily dye penetrants such as disclosed in the patents mentioned above as well as in the dye penetrant set forth in Example I above when added thereto in a one to one ratio by volume. However, zinc stearate did not produce a jell in combination with the dye penetrant used in Example I but instead resulted in an opaque paste which was found to be fairly effective in disclosing microcracks but substantially less sensitive than the dye penetrant used without the addition of zinc stearate.

While the particular details set forth above are fully capable of attaining the objects and providing the advantages herein stated, the specific materials and method thus disclosed are merely illustrative and could be varied to produce the same results without departing from the scope of the inventive concept as defined in the following claims.

I claim:
1. A dye penetrant for disclosing minute defects in a specimen surface, comprising:
    at least one dye,
    at least one slow evaporating liquid vehicle for conveying said dye into said defects, and
    a powdered particulate having sponge-like properties capable of absorbing said liquid vehicle without affecting the viscosity of said vehicle, and added thereto in an amount sufficient to render said dye penetrant sufficiently adhesive to prevent runoff of said vehicle due to gravity when said surface is vertical, slanted or inverted.
2. The dye penetrant set forth in claim 1 above, wherein said particulate comprises airbourne silica and is added to said liquid vehicle and dye in combination in a ratio from one to four parts of particulate for each one part of dye-vehicle combination.
3. The dye penetrant set forth in claim 1 above, wherein said particulate consists of silicon dioxide having a particle size range from about .015 to about .020 micron.
4. The dye penetrant set forth in claim 3 above, wherein said vehicle comprises n-methyl-2-pyrrolidone.
5. A method of detecting minute surface defects in a specimen surface, comprising:
    applying to said surface a material containing a liquid vehicle in combination with a sufficient amount of silicon dioxide to convert said liquid to a grease-like consistency, said material further containing a fluorescing dye,
    removing said material from said surface while some of said dye remains in said surface defects, and
    viewing said surface under ultra-violet light to determine the location, size and shape of said defects as revealed by the presence of said remaining dye.
6. In a method of detecting minute surface defects in a surface:
    applying to said surface a non-liquid material containing at least one liquid solvent for a dye, a quantity of said dye dissolved in said vehicle, and a filler material,
    said filler material comprising a particulate adapted to absorb said liquid solvent and being added thereto in an amount sufficient to prevent runoff of said non-liquid material when applied to a vertical surface, removing said non-liquid material from said surface while some of said dye remains in said defects, and determining the presence and location of said defects as revealed by the presence of said remaining dye.

7. The method set forth in claim 6 above, wherein said liquid solvent comprises a lactam.

8. The method set forth in claim 6 above, wherein said filler material comprises uncompressed silicon dioxide added to said liquid solvent in a proportion of from about one to four parts particulate to each one part of solvent, said silicon dioxide having a particle size range from about .015 to about .020 micron.

References Cited
UNITED STATES PATENTS

| | | |
|---|---|---|
| 2,707,236 | 4/1955 | De Forest. |
| 2,806,959 | 9/1957 | De Forest et al. |
| 3,114,039 | 12/1963 | Switzer. |

ARCHIE R. BORCHELT, Primary Examiner

U.S. Cl. X.R.

252—301.2